United States Patent
Wu et al.

(10) Patent No.: US 12,108,744 B1
(45) Date of Patent: Oct. 8, 2024

(54) METHOD FOR OPTIMIZATION DESIGN OF ARTIFICIAL REEF STRUCTURE

(71) Applicant: GUANGDONG OCEAN UNIVERSITY, Zhanjiang (CN)

(72) Inventors: Guanglin Wu, Zhanjiang (CN); Zhangfeng Yang, Zhanjiang (CN); Hui Yang, Zhanjiang (CN); Yan Tian, Zhanjiang (CN); Yanli He, Zhanjiang (CN); Zhenglin Tian, Zhanjiang (CN); Jinbo Lin, Zhanjiang (CN); Dongbin He, Zhanjiang (CN); Huiling Zhang, Zhanjiang (CN); Hongfei Mao, Zhanjiang (CN); Chunhua Zeng, Zhanjiang (CN); Yingchao Ma, Zhanjiang (CN); Xiaofen Wang, Zhanjiang (CN); Jintao Xu, Zhanjiang (CN); Zhongbing Zhou, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 18/676,515

(22) Filed: May 29, 2024

Related U.S. Application Data

(63) Continuation of application No. PCT/CN2023/138316, filed on Dec. 13, 2023.

(30) Foreign Application Priority Data

May 23, 2023 (CN) .......................... 202310579209.7

(51) Int. Cl.
    G01F 5/00      (2006.01)
    A01K 61/70    (2017.01)
    G01P 5/00      (2006.01)
    G01P 5/24      (2006.01)

(52) U.S. Cl.
    CPC .............. *A01K 61/70* (2017.01); *G01P 5/001* (2013.01); *G01P 5/241* (2013.01)

(58) Field of Classification Search
    CPC .......... A01K 61/70; G01P 5/001; G01P 5/241
    See application file for complete search history.

(56) References Cited

PUBLICATIONS

Li, Jiajia et al. "Effects of the artificial reef and flow field environment on the habitat selection behavior of Sebastes schlegelii juveniles". Applied Animal Behaviour Sciences (2021) (Year: 2021).*
Mao Haiying,Hu Cong,Yu Dingyong,Wang Kairui, Optimatimization study of diversion reef assemblage based on the numerical simulation of flow field, J Xiamen Univ Nat Sci, Jul. 2022, pp. 723-730, vol. 61 No. 4, China Academic Journal Electronic Publishing House, China.

* cited by examiner

*Primary Examiner* — Tarun Sinha

(57) ABSTRACT

Disclosed is a method for optimization design of an artificial reef structure. The method includes: arranging an artificial reef model to be tested on a test platform, testing a flow field to obtain flow field data and a pull force of an artificial reef, analyzing the flow field data to obtain a flow velocity reference point, and carrying out optimization analysis in combination with the flow field data and the pull force.

2 Claims, 1 Drawing Sheet

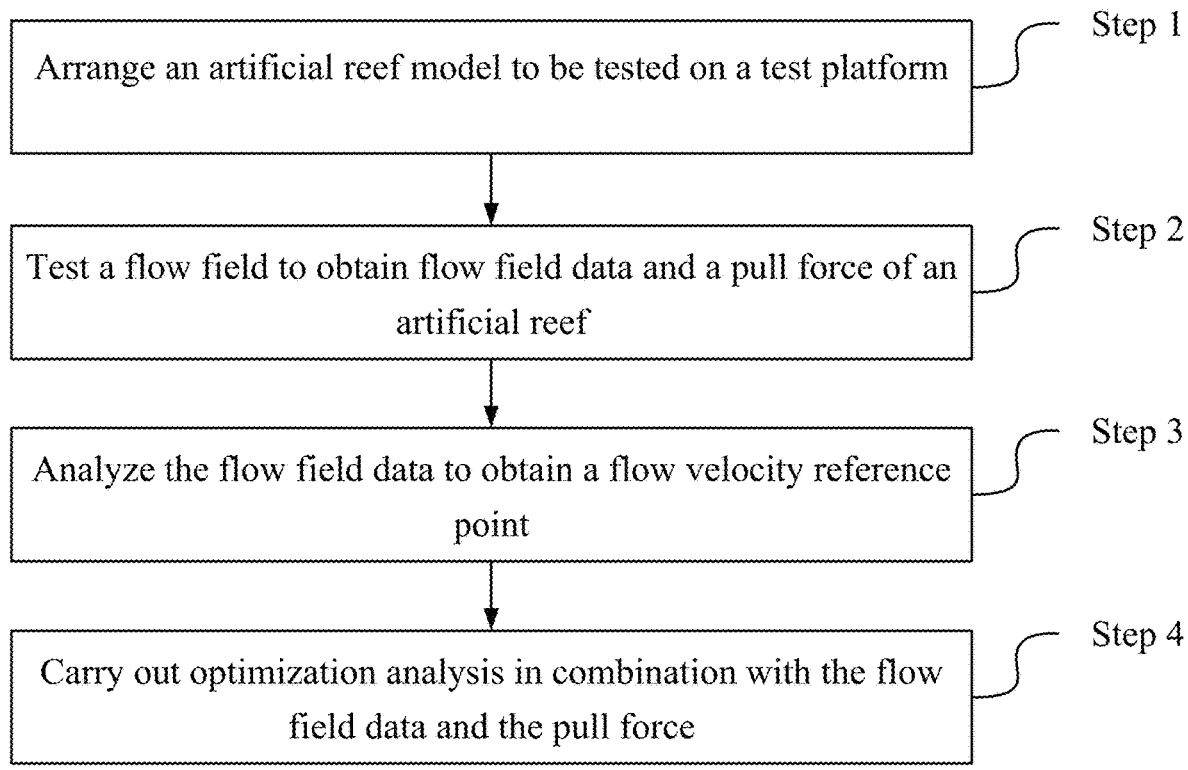

METHOD FOR OPTIMIZATION DESIGN OF ARTIFICIAL REEF STRUCTURE

TECHNICAL FIELD

The present disclosure relates to the technical field of fishery apparatuses, and in particular to a method for optimization design of an artificial reef structure.

BACKGROUND

An artificial reef, a structure artificially created and mounted in a water area, is generally placed in an ocean or freshwater to simulate the shape and function of a natural reef, provide a living environment and habitat for aquatic organisms, so as to improve their habitat, and provide feeding, breeding, growth, and development sites for marine economic organisms, so as to achieve the purpose of protecting and proliferating fishery resources and improving the quality of fish catch.

The artificial reef usually consists of concrete, rock, gravel, ceramics, or plastics, and its structural design can also change the effect of water flow in artificial reef water of the artificial reef. An existing analysis method includes model experiments and computational fluid dynamics numerical calculations, which can simulate experiments for different structures, materials, and placement positions. However, input parameters for simulation and computational fluid dynamics numerical calculations are complex, and it is difficult for model debugging to satisfy convergence requirements.

SUMMARY

An objective of the present disclosure is to provide a method for optimization design of an artificial reef structure, so as to solve one or more technical problems existing in the prior art and at least provide a beneficial selection or creation condition.

In order to achieve the above technical objective, the technical solution of the present disclosure is as follows:
a method for optimization design of an artificial reef structure includes:
step 1, arranging an artificial reef model to be tested on a test platform;
step 2, testing a flow field to obtain flow field data and a pull force of an artificial reef;
step 3, analyzing the flow field data to obtain a flow velocity reference point; and
step 4, carrying out optimization analysis in combination with the flow field data and the pull force.

Further, the arranging an artificial reef model to be tested on a test platform in the step 1 includes:
arranging two artificial reefs, where the spacing between the artificial reefs is fixed, an orientation of each artificial reef is consistent, and an arrangement direction of the artificial reef is perpendicular to the water flow direction.

Further, the testing a flow field to obtain flow field data and a pull force of an artificial reef in the step 2 includes:
with the test platform including a water tank, where one end of the water tank is connected to a flow generator, the flow generator generates water flow having a fixed velocity, the generated water flow passes through the artificial reef, and the artificial reef is suspended on the water tank by means of a six-component force meter, such that a bottom of the artificial reef does not make contact with the water tank,
setting a measurement region, where the measurement region includes a periphery of the artificial reef, and gridding the measurement region to obtain a plurality of grids;
measuring a water flow velocity around the artificial reef through an acoustic Doppler flow meter; and
measuring a gravity of the artificial reef by means of the six-component force meter, and recording the gravity as the pull force of the artificial reef under different flow velocities.

In an example, L is 20 cm.

Optionally, the flow velocity is measured through a Vectrino point flow meter, each point is measured three times, and an average value of flow velocities is used as the flow velocity of the measurement region.

Further, the testing a flow field to obtain flow field data and a pull force of an artificial reef further includes:
starting, by the flow generator, to work, and setting the water flow velocity $V0$, where the water flow enters the water tank and flows through the artificial reef;
placing the acoustic Doppler flow meter in each grid of the measurement region to measure the water flow velocity, and using an average value of flow velocity data continuously recorded for 10 s at each point as the water flow velocity; and
with a size of the grid being $0.1 L \times 0.1 L$, where L is a width or length of the artificial reef, using a length of a side of the artificial reef perpendicular to a water flow direction as L under the condition that a length and width of the artificial reef are unequal, and recording a side of each artificial reef on a horizontal plane parallel to the water flow direction as a side A, and a side perpendicular to the water flow as a side B.

Further, the analyzing the flow field data to obtain a flow velocity reference point in step 3 includes:
obtaining the water flow velocity in each grid;
constructing a velocity contour of a cross section according to the water flow velocity; and
changing spacing between the artificial reefs to obtain velocity contours of the cross section under different spacing, and recording the velocity contours of the cross section as a velocity contour set VP, where the set spacing at least includes a value less than L, and the water flow velocity refers to a component of a velocity of the water flow in a direction parallel to a water surface.

Further, the analyzing the flow field data to obtain a flow velocity reference point in the step 3 specifically includes:
obtaining a center position of a grid having a maximum water flow velocity and a corresponding water flow velocity value from the velocity contour set VP under different transverse spacing of the artificial reef, and recording the center position of the grid having the maximum water flow velocity and the corresponding water flow velocity value as $maxP_i$ and $maxV_i$, where i is a variable, $maxP_i$ and $maxV_i$ represent a position of a point having the maximum water flow velocity obtained in the velocity contour $VP_i$ and the corresponding water flow velocity under i-th spacing respectively, $i \in [1, len(VP)]$, $len(VP)$ is a size of VP, i.e. the number of the set spacing; and $VP_i$ is an i-th velocity contour, such that a value of i is 1;
step 3.1, proceeding to step 3.2 under the condition that a value of $maxP_i/V0$ is greater than a ratio of $L(VP_i)$ to L, and otherwise, proceeding to step 3.3 to obtain the flow velocity reference point; and recording L(VPi) as spacing between the artificial reefs under the i-th velocity contour;

step 3.2, increasing a value of i by 1 by using the position of maxPi as a reference point, proceeding to step 3.4 under the condition that i is greater than len(VP), and otherwise restarting step 3.1;

step 3.3, recording two opposite sides A in two artificial reefs as sides A1 of each artificial reef respectively, using end points of one ends of the two sides A1 close to a water flow incoming direction to make a line segment, increasing the value of i by 1 by using a midpoint of the line segment and a midpoint of the point maxPi as reference points, proceeding to step 3.4 under the condition of i>len(VP), and otherwise restarting step 3.1; and step 3.4, obtaining flow velocity reference points under all artificial reef spacing.

Further, the carrying out optimization analysis in combination with the flow field data and the pull force in the step 4 includes:

in one velocity contour, constructing a closed region as a turbulence reference region according to a straight line in which two sides A1 are located and a straight line in which two sides B of one artificial reef are located separately;

using a closed region formed by a straight line of a side B of one artificial reef away from the water flow and two sides A and an edge of the water tank as a wake region of the flow artificial reef;

selecting a first velocity contour obtained from a flow field test in the velocity contour set VP when the spacing between the artificial reefs is less than L, obtaining a value of a maximum flow velocity point in the turbulence region as V1max, using maxV1 as a turbulence reference value Vref under the condition of V1max<maxV1, and otherwise, using a value of V1max as a turbulence reference value Vref, where maxV1 is a maximum flow velocity value obtained in the first velocity contour;

recording the number of the spacing of the artificial reefs in the velocity contour set VP less than L as n1, and setting the value of i as n1+1; and initializing an empty set Vmean, and a point set Pmax;

proceeding to step 4.1 under the condition that a flow velocity reference point is provided in the turbulence region in the velocity contour VPi, and otherwise, proceeding to step 4.2;

step 4.1, recording a maximum point of a flow velocity in the turbulence region in the velocity contour VPi as Pmaxi, and recording a closed region formed by a minimum point of a flow velocity in two wake regions and Pmaxi as a first wake region;

step 4.1.1, removing an overlapping region from the first wake region as a new first wake region under the condition that the constructed first wake region overlaps any artificial reef, recording the first wake region as Ai and an average flow velocity of all sampling points in the first wake region as Vmeani, and putting Vmeani into Vmean and Pmaxi into a point set Pmax; and proceeding to step 4.3;

step 4.2, selecting the maximum point of the flow velocity from the velocity contour VPi, recording the maximum point as Pmaxi, constructing the first wake region according to an end point closest to Pmaxi from two artificial reefs and Pmaxi separately, recording the first wake region as Ai and the average flow velocity of all sampling points in the region as Vmeani, putting Vmeani into Vmean, and proceeding to step 4.3;

step 4.3, sequentially traversing points of a reference point set, and proceeding to step 4.1 or 4.2 to obtain the first wake region and the average flow velocity in the region;

step 4.4, setting an upwelling resistance limiting condition:

$$\frac{V_{meank}}{V_{ref}} \geq \exp\left(\frac{UPF(Ak)}{Lk^2 \times H}\right) \times \sqrt{Wk/W0};$$

and

Vmeank<Vhk, where

Vmeank is an average flow velocity value of all measurement regions at k-th spacing, Vref is a turbulence reference value, UPF(Ak) is an upwelling volume of a region Ak, Wk is a pull force of the artificial reef at the k-th spacing, W0 is a pull force of the artificial reef at the water flow velocity of 0, exp( ) is an exponential function having a natural constant e as a base, Lk is a spacing value of the artificial reef at the k-th spacing, H is a height of the artificial reef, and Vhk is a vertical maximum velocity of the water flow in all the measurement areas at the k-th spacing; and step 4.5, determining the upwelling resistance limiting condition when the spacing between the artificial reefs is greater than L, and obtaining a structure optimization direction of the artificial reef under the condition that the number of the artificial reefs satisfying the upwelling resistance limiting condition is greater than half len(VP): optimizing the flow velocity of the artificial reef structure; and otherwise, obtaining a structure optimization direction of the artificial reef: optimizing a resistance of the artificial reef structure.

In step 4.5, the turbulence reference value is introduced as a comparison standard in combination with hydrodynamic characteristics and a maximum upwelling height of the flow field data, and the optimization direction of the artificial reef is obtained in combination with buoyancy received by the artificial reef. The method is suitable for selecting and optimizing square, trapezoid and flow guide square artificial reefs.

Optionally, all undefined variables in the present disclosure, if not explicitly defined, may be manually set thresholds.

Compared with the prior art, the present disclosure has the following beneficial technical effects:

design optimization of the artificial reef can be simulated according to model experiments and computational fluid dynamics, but has a tedious operation, and cannot cover different flow velocity ranges. The present disclosure simplifies measurement steps and a calculation method, obtains the flow field data by setting different transverse spacing, and optimizes a direction of upwelling data. Moreover, the present disclosure can further be used for selecting artificial reefs having different structures.

BRIEF DESCRIPTION OF THE DRAWING

FIG. 1 is a flow chart of a method for optimization design of an artificial reef structure according to the present disclosure.

DETAILED DESCRIPTION OF THE EMBODIMENTS

In order to make the objectives, technical solutions and advantages of the present disclosure clearer, the present disclosure will be further described in detail below in combination with the accompanying drawing and examples. The particular examples described herein are merely used to explain the present disclosure, and are not used to limit the present disclosure.

It should also be understood that the following examples are only used to further describe the present disclosure and cannot be understood as a limitation on the scope of protection of the present disclosure. Some non-essential improvements and adjustments made by those skilled in the art according to the above content of the present disclosure belong to the scope of protection of the present disclosure. The specific process parameters in the following examples are only one example within an appropriate rang. That is, those skilled in the art can make appropriate choices within the range through the explanation herein, rather than being limited to the specific values in the following examples.

A method for optimization design of an artificial reef structure according to the present disclosure is illustratively described below.

FIG. 1 shows a flow chart of a method for optimization design of an artificial reef structure. The method for optimization design of an artificial reef structure according to the embodiment of the present disclosure will be illustrated below in combination with FIG. 1. The method includes:

step 1, arranging an artificial reef model to be tested on a test platform;
step 2, testing a flow field to obtain flow field data and a pull force of an artificial reef;
step 3, analyzing the flow field data to obtain a flow velocity reference point; and
step 4, carrying out optimization analysis in combination with the flow field data and the pull force.

Further, the step 1 of arranging an artificial reef model to be tested on a test platform includes:
arranging two artificial reefs, where the spacing between the artificial reefs is fixed, an orientation of each artificial reef is consistent, and an arrangement direction of the artificial reef is perpendicular to the water flow direction.

Further, the step 2 of testing a flow field to obtain flow field data and a pull force of an artificial reef includes:
starting, by the flow generator, to work, and setting the water flow velocity V0, where the water flow enters the water tank and flows through the artificial reef, where in an example, V0 is 0.75 m/s;
placing the acoustic Doppler flow meter in each grid of the measurement region to measure the water flow velocity, and using an average value of flow velocity data continuously recorded for 10 s at each point as the water flow velocity; and
with a size of the grid being 0.1 L×0.1 L, where L is a side length of the artificial reef, using a length of a side of the artificial reef perpendicular to a water flow direction as L under the condition that a length and width of the artificial reef are unequal, and recording a side of each artificial reef on a horizontal plane parallel to the water flow direction as a side A, and a side perpendicular to the water flow as a side B.
In an example, L is 20 cm.
Optionally, the flow velocity is measured through a Vectrino point flow meter, each point is measured three times, and an average value of flow velocities is used as the flow velocity of the measurement region.

Further, the substep of testing a flow field to obtain flow field data and a pull force of an artificial reef further includes:
starting, by the flow generator, to work, and setting the water flow velocity V0, where the water flow enters the water tank and flows through the artificial reef;
placing the acoustic Doppler flow meter in each grid of the measurement region to measure the water flow velocity, and using an average value of flow velocity data continuously recorded for 10 s at each point as the water flow velocity; and
with a size of the grid being 0.1 L×0.1 L, where L is a width or length of the artificial reef, using a length of a side of the artificial reef perpendicular to a water flow direction as L under the condition that a length and width of the artificial reef are unequal, and recording a side of each artificial reef on a horizontal plane parallel to the water flow direction as a side A, and a side perpendicular to the water flow as a side B.

Further, the step 3 of analyzing the flow field data to obtain a flow velocity reference point includes:
obtaining a center position of a grid having a maximum water flow velocity and a corresponding water flow velocity value from the velocity contour set VP under different transverse spacing of the artificial reef, and recording the center position of the grid having the maximum water flow velocity and the corresponding water flow velocity value as maxPi and maxVi, where i is a variable, maxPi and maxVi represent a position of a point having the maximum water flow velocity obtained in the velocity contour VPi and the corresponding water flow velocity under i-th spacing respectively, i∈[1, len(VP)], len(VP) is a size of VP, i.e. the number of the set spacing; and VPi is an i-th velocity contour, such that a value of i is 1;
step 3.1, proceeding to step 3.2 under the condition that a value of maxPi/V0 is greater than a ratio of L(VPi) to L, and otherwise, proceeding to step 3.3 to obtain the flow velocity reference point; and recording L(VPi) as spacing between the artificial reefs under the i-th velocity contour;
step 3.2, increasing a value of i by 1 by using the position of maxPi as a reference point, proceeding to step 3.4 under the condition that i is greater than len(VP), and otherwise restarting step 3.1;
step 3.3, recording two opposite sides A in two artificial reefs as sides A1 of each artificial reef respectively, using end points of one ends of the two sides A1 close to a water flow incoming direction to make a line segment, increasing the value of i by 1 by using a midpoint of the line segment and a midpoint of the point maxPi as reference points, proceeding to step 3.4 under the condition of i>len(VP), and otherwise restarting step 3.1; and
step 3.4, obtaining flow velocity reference points under all artificial reef spacing.

Further, the step 4 of carrying out optimization analysis in combination with the flow field data and the pull force includes:
in one velocity contour, constructing a closed region as a turbulence reference region according to a straight line in which two sides A1 are located and a straight line in which two sides B of one artificial reef are located separately;

using a closed region formed by a straight line of a side B of one artificial reef away from the water flow and two sides A and an edge of the water tank as a wake region of the flow artificial reef;

selecting a first velocity contour obtained from a flow field test in the velocity contour set VP when the spacing between the artificial reefs is less than L, obtaining a value of a maximum flow velocity point in the turbulence region as V1max, using maxV1 as a turbulence reference value Vref under the condition of V1max<maxV1, and otherwise, using a value of V1max as a turbulence reference value Vref, where max V1 is a maximum flow velocity value obtained in the first velocity contour;

recording the number of the spacing of the artificial reefs in the velocity contour set VP less than L as n1, and setting the value of i as n1+1; and initializing an empty set Vmean, and a point set Pmax;

proceeding to step 4.1 under the condition that a flow velocity reference point is provided in the turbulence region in the velocity contour VPi, and otherwise, proceeding to step 4.2;

step 4.1, recording a maximum point of a flow velocity in the turbulence region in the velocity contour VPi as Pmaxi, and recording a closed region formed by a minimum point of a flow velocity in two wake regions and Pmaxi as a first wake region;

step 4.1.1, removing an overlapping region from the first wake region as a new first wake region under the condition that the constructed first wake region overlaps any artificial reef, recording the first wake region as Ai and an average flow velocity of all sampling points in the first wake region as Vmeani, and putting Vmeani into Vmean and Pmaxi into a point set Pmax; and proceeding to step 4.3;

step 4.2, selecting the maximum point of the flow velocity from the velocity contour VPi, recording the maximum point as Pmaxi, constructing the first wake region according to an end point closest to Pmaxi from two artificial reefs and Pmaxi separately, recording the first wake region as Ai and the average flow velocity of all sampling points in the region as Vmeani, putting Vmeani into Vmean, and proceeding to step 4.3;

step 4.3, sequentially traversing points of a reference point set, and proceeding to step 4.1 or 4.2 to obtain the first wake region and the average flow velocity in the region;

step 4.4, setting an upwelling resistance limiting condition:

$$\frac{v_{meank}}{v_{ref}} \geq \exp\left(\frac{UPF(Ak)}{Lk^2 \times H}\right) \times \sqrt{Wk/W0};$$

and

Vmeank<Vhk, where

Vmeank is an average flow velocity value of all measurement regions at k-th spacing, Vref is a turbulence reference value, UPF(Ak) is an upwelling volume of a region Ak, Wk is a pull force of the artificial reef at the k-th spacing, W0 is a pull force of the artificial reef at the water flow velocity of 0, exp( ) is an exponential function having a natural constant e as a base, Lk is a spacing value of the artificial reef at the k-th spacing, H is a height of the artificial reef, and Vhk is a vertical maximum velocity of the water flow in all the measurement areas at the k-th spacing; and step 4.5, determining the upwelling resistance limiting condition when the spacing between the artificial reefs is greater than L, and obtaining a structure optimization direction of the artificial reef under the condition that the number of the artificial reefs satisfying the upwelling resistance limiting condition is greater than half len(VP): optimizing the flow velocity of the artificial reef structure; and otherwise, obtaining a structure optimization direction of the artificial reef: optimizing a resistance of the artificial reef structure.

Optionally, all undefined variables in the present disclosure, if not explicitly defined, may be manually set thresholds.

In the step, the turbulence reference value is introduced as a comparison standard in combination with hydrodynamic characteristics and a maximum upwelling height of the flow field data, and the optimization direction of the artificial reef is obtained in combination with buoyancy received by the artificial reef. The method is suitable for selecting and optimizing square, trapezoid and flow guide square artificial reefs.

Design optimization of the artificial reef can be simulated according to model experiments and computational fluid dynamics, but has a tedious operation, and cannot cover different flow velocity ranges. The present disclosure simplifies measurement steps and a calculation method, obtains the flow field data by setting different transverse spacing, and optimizes a direction of upwelling data. Moreover, the present disclosure can further be used for selecting artificial reefs having different structures.

Although the description of the present disclosure has already been quite detailed and specifically describes several examples, the description is not intended to be limited to any of these details or examples or any special examples, thereby effectively covering the predetermined scope of the present disclosure. Furthermore, the above description of the present disclosure is based on foreseeable examples by the inventor, with the purpose of providing useful description. Non-substantial modifications to the present disclosure that are flowly unforeseeable can still represent equivalent modifications of the present disclosure.

In the description, the description with reference to the terms such as "an example", "some examples", "illustrative examples", "exemplary examples", "particular exemplary examples", or "some exemplary examples" means that specific features, structures, materials, or characteristics described in combination with the example(s) or example(s) are included in at least one example or exemplary example of the present disclosure. In the description, the schematic descriptions of the above terms do not necessarily refer to the same example or exemplary example. Moreover, the specific feature, structure, material or characteristics described can be combined in a suitable manner in any one or more examples or exemplary examples.

Although the examples of the present disclosure have been illustrated and described, it should be understood that those of ordinary skill in the art can make various changes, modifications, replacements and variations to the above examples without departing from the principle and spirit of the present disclosure.

What is claimed is:

1. A method for optimization design of an artificial reef structure, comprising:
    step 1, arranging an artificial reef model to be tested on a test platform;
    step 2, testing a flow field to obtain flow field data and a pull force of an artificial reef;

step 3, analyzing the flow field data to obtain a flow velocity reference point; and step 4, carrying out optimization analysis in combination with the flow field data and the pull force, wherein the testing a flow field to obtain flow field data and a pull force of an artificial reef in the step 2 comprises:

with the test platform comprising a water tank, wherein one end of the water tank is connected to a flow generator, the flow generator generates water flow having a fixed velocity, the generated water flow passes through the artificial reef, and the artificial reef is suspended on the water tank by means of a six-component force meter, such that a bottom of the artificial reef does not make contact with the water tank, setting a measurement region, wherein the measurement region comprises a periphery of the artificial reef, and gridding the measurement region to obtain a plurality of grids;

measuring a water flow velocity around the artificial reef through an acoustic Doppler flow meter; and measuring a gravity of the artificial reef by means of the six-component force meter, and recording the gravity as the pull force of the artificial reef under different flow velocities;

the testing a flow field to obtain flow field data and a pull force of an artificial reef further comprises:

starting, by the flow generator, to work, and setting the water flow velocity V0, wherein the water flow enters the water tank and flows through the artificial reef;

placing the acoustic Doppler flow meter in each grid of the measurement region to measure the water flow velocity, and using an average value of flow velocity data continuously recorded for 10 s at each point as the water flow velocity; and with a size of the grid being 0.1 L×0.1 L, wherein L is a side length of the artificial reef, using a length of a side of the artificial reef perpendicular to a water flow direction as L under the condition that a length and width of the artificial reef are unequal, and recording a side of each artificial reef on a horizontal plane parallel to the water flow direction as a side A, and a side perpendicular to the water flow as a side B;

the analyzing the flow field data to obtain a flow velocity reference point in step 3 comprises:

obtaining the water flow velocity in each grid;

constructing a velocity contour of a cross section according to the water flow velocity; and changing spacing between the artificial reefs to obtain velocity contours of the cross section under different spacing, and recording the velocity contours of the cross section as a velocity contour set VP, wherein the set spacing at least comprises a value less than L, and the water flow velocity refers to a component of a velocity of the water flow in a direction parallel to a water surface;

the analyzing the flow field data to obtain a flow velocity reference point in step 3 specifically comprises:

obtaining a center position of a grid having a maximum water flow velocity and a corresponding water flow velocity value from the velocity contour set VP under different transverse spacing of the artificial reef, and recording the center position of the grid having the maximum water flow velocity and the corresponding water flow velocity value as maxPi and maxVi, wherein i is a variable, maxPi and maxVi represent a position of a point having the maximum water flow velocity obtained in the velocity contour VPi and the corresponding water flow velocity under i-th spacing respectively, i∈[1, len(VP)], len(VP) is a size of VP, i.e. the number of the set spacing; and VPi is an i-th velocity contour, such that a value of i is 1;

step 3.1, proceeding to step 3.2 under the condition that a value of max Vi/V0 is greater than a ratio of L(VPi) to L, and otherwise, proceeding to step 3.3 to obtain the flow velocity reference point; and recording L(VPi) as spacing between the artificial reefs under the i-th velocity contour;

step 3.2, increasing a value of i by 1 by using the position of maxPi as a reference point, proceeding to step 3.4 under the condition that i is greater than len(VP), and otherwise restarting step 3.1;

step 3.3, recording two opposite sides A in two artificial reefs as sides A1 of each artificial reef respectively, using end points of one ends of the two sides A1 close to a water flow incoming direction to make a line segment, increasing the value of i by 1 by using a midpoint of the line segment and a midpoint of the point maxPi as reference points, proceeding to step 3.4 under the condition of i>len(VP), and otherwise restarting step 3.1; and step 3.4, obtaining flow velocity reference points under all artificial reef spacing; and the carrying out optimization analysis in combination with the flow field data and the pull force in step 4 comprises:

in one velocity contour, constructing a closed region as a turbulence region according to a straight line in which two sides A1 are located and a straight line in which two sides B of one artificial reef are located separately;

using a closed region formed by a straight line of a side B of one artificial reef away from the water flow and two sides A and an edge of the water tank as a wake region of the flow artificial reef;

selecting a first velocity contour obtained from a flow field test in the velocity contour set VP when the spacing between the artificial reefs is less than L, obtaining a value of a maximum flow velocity point in the turbulence region as V1max, using maxV1 as a turbulence reference value Vref under the condition of V1max<maxV1, and otherwise, using a value of V1max as a turbulence reference value Vref, wherein max V1 is a maximum flow velocity value obtained in the first velocity contour;

recording the number of the spacing of the artificial reefs in the velocity contour set VP less than L as n1, and setting the value of i as n1+1; and initializing an empty set Vmean, and a point set Pmax;

proceeding to step 4.1 under the condition that a flow velocity reference point is provided in the turbulence region in the velocity contour VPi, and otherwise, proceeding to step 4.2;

step 4.1, recording a maximum point of a flow velocity in the turbulence region in the velocity contour VPi as Pmaxi, and recording a closed region formed by a minimum point of a flow velocity in two wake regions and Pmaxi as a first wake region;

step 4.1.1, removing an overlapping region from the first wake region as a new first wake region under the condition that the constructed first wake region overlaps any artificial reef, recording the first wake region as Ai and an average flow velocity of all sampling points in the first wake region as Vmeani, and putting Vmeani into Vmean and Pmaxi into a point set Pmax; and proceeding to step 4.3;

step 4.2, selecting the maximum point of the flow velocity from the velocity contour VPi, recording the maximum point as Pmaxi, constructing the first wake region according to an end point closest to Pmaxi from two artificial reefs and Pmaxi separately, recording the first wake region as Ai and the average flow velocity of all sampling points in the region as Vmeani, putting Vmeani into Vmean, and proceeding to step 4.3;

step 4.3, sequentially traversing points of a reference point set, and proceeding to step 4.1 or 4.2 to obtain the first wake region and the average flow velocity in the region;

step 4.4, setting an upwelling resistance limiting condition:

$$\frac{V_{mean}^k}{V_{ref}} \geq \exp\left(\frac{UPF(Ak)}{Lk^2 \times H}\right) \times \sqrt{Wk/W0};$$

and $V_{mean}k < Vhk$, wherein $V_{mean}k$ is an average flow velocity value of all measurement regions at k-th spacing, Vref is a turbulence reference value, UPF(Ak) is an upwelling volume of a region Ak, Wk is a pull force of the artificial reef at the k-th spacing, W0 is a pull force of the artificial reef at the water flow velocity of 0, exp( ) is an exponential function having a natural constant e as a base, Lk is a spacing value of the artificial reef at the k-th spacing, H is a height of the artificial reef, and Vhk is a vertical maximum velocity of the water flow in all the measurement areas at the k-th spacing; and step 4.5, determining the upwelling resistance limiting condition when the spacing between the artificial reefs is greater than L, and obtaining a structure optimization direction of the artificial reef under the condition that the number of the artificial reefs satisfying the upwelling resistance limiting condition is greater than half len(VP): optimizing the flow velocity of the artificial reef structure; and otherwise, obtaining a structure optimization direction of the artificial reef: optimizing a resistance of the artificial reef structure.

2. The method for optimization design of the artificial reef structure according to claim 1, wherein the arranging the artificial reef model to be tested on the test platform in the step 1 comprises:

arranging two artificial reefs, wherein the spacing between the artificial reefs is fixed, an orientation of each artificial reef is consistent, and an arrangement direction of the artificial reef is perpendicular to the water flow direction.

* * * * *